United States Patent [19]

Nissel

[11] 4,300,772

[45] Nov. 17, 1981

[54] SEALING ARRANGEMENT FOR ROTATABLY MOUNTED SHAFTS

[75] Inventor: Jürgen Nissel, Wesel, Fed. Rep. of Germany

[73] Assignee: Pintsch Bamag Antriebs-und Verkehrstechnik GmbH, Dinslaken, Fed. Rep. of Germany

[21] Appl. No.: 77,834

[22] Filed: Sep. 21, 1979

[30] Foreign Application Priority Data

Sep. 30, 1978 [DE] Fed. Rep. of Germany ....... 2842780

[51] Int. Cl.³ .............................................. F16J 15/40
[52] U.S. Cl. ......................................... 277/3; 277/15;
277/65; 277/92; 277/135
[58] Field of Search ................... 277/3, 15, 17, 18, 21,
277/27, 59, 81 R, 92, 65, 135

[56] References Cited

U.S. PATENT DOCUMENTS

| | | | |
|---|---|---|---|
| 2,318,181 | 5/1943 | Myers | 277/135 |
| 2,407,807 | 9/1946 | Bentley | 277/3 X |
| 2,950,931 | 8/1960 | Englesson | 277/65 X |
| 3,167,321 | 1/1965 | Land et al. | 277/92 |
| 3,273,899 | 9/1966 | Warnery | 277/3 |
| 3,414,274 | 12/1968 | Aronson | 277/15 |
| 3,506,276 | 4/1970 | Petersen et al. | 277/27 X |
| 3,746,350 | 7/1973 | Mayer et al. | 277/15 X |
| 3,762,724 | 10/1973 | Porter | 277/65 X |
| 3,951,417 | 4/1976 | Chernykh | 277/92 X |
| 4,168,936 | 9/1979 | Sheller et al. | 277/27 X |

FOREIGN PATENT DOCUMENTS

| | | | |
|---|---|---|---|
| 270270 | 7/1928 | United Kingdom | 277/3 |
| 1387255 | 3/1975 | United Kingdom | 277/3 |

*Primary Examiner*—Robert S. Ward, Jr.
*Attorney, Agent, or Firm*—Craig and Antonelli

[57] ABSTRACT

A sealing arrangement is provided for a shaft rotatably mounted in a housing which is operable in an abrasive media such as sandy sea water or the like. The sealing arrangement includes a main seal and an auxiliary seal fitted around the shaft with a chamber formed between these seals for accommodating a separating medium. The chamber includes a feed opening and supply arrangement for continuously communicating pressurized separating medium, such as air or clean water to said chamber. An outlet opening is provided at the bottom of the chamber for accommodating exhaust of abrasive media which may accumulate in the chamber during non-operating conditions. The separating medium supply and exhaust, as well as the configuration of the auxiliary seal is such as to assure continuous escape of a portion of the separating medium through the auxiliary seal during operation, thereby preventing ingress of the surrounding abrasive medium into the chamber during operations via the auxiliary seal.

11 Claims, 1 Drawing Figure

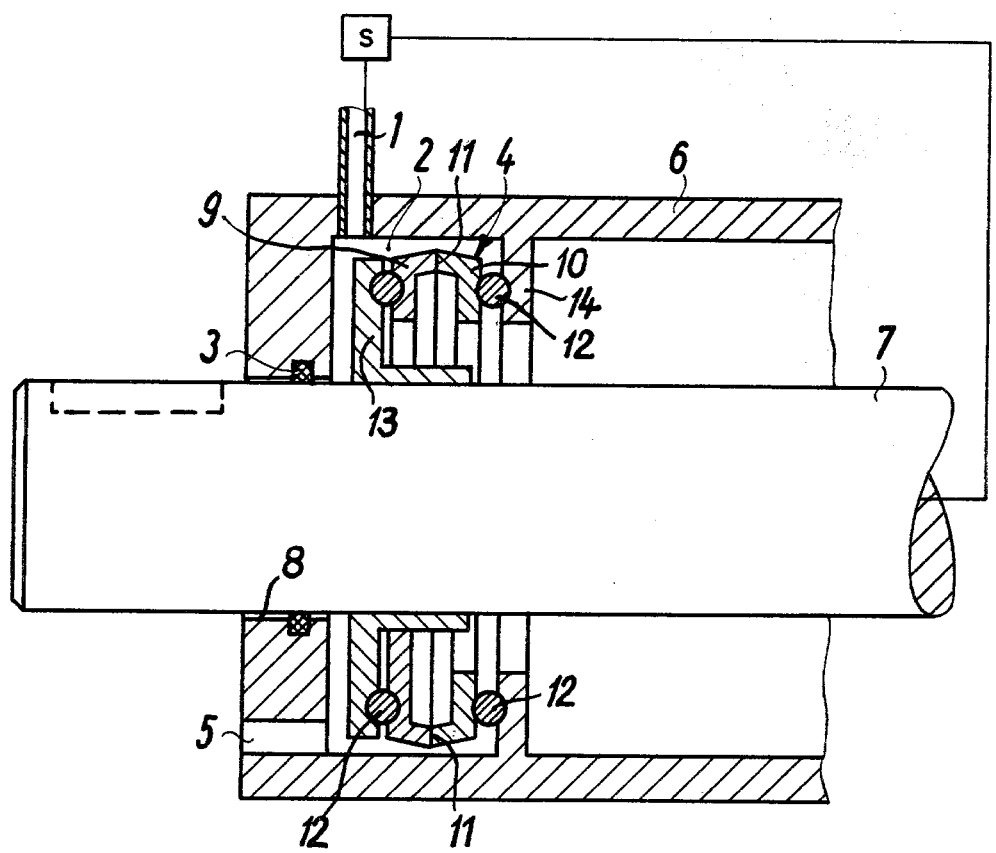

SEALING ARRANGEMENT FOR ROTATABLY MOUNTED SHAFTS

BACKGROUND AND SUMMARY OF THE INVENTION

This invention relates to a sealing arrangement for a shaft rotatably mounted in a housing and which operates in an abrasive media, such as shafts for ship drives and the like. More particularly, the invention relates to sealing arrangements of the type having a main seal and an auxiliary seal fitted around the shaft, and with a chamber between the seals delimited by housing and shaft parts, which chamber is filled with a pressurized medium.

Sealing arrangements of this type are known, and are used, for example, in ship construction for sealing the tail shaft in the stern tube. The known sealing arrangements comprise a hollow space filled with pressure oil between an outer auxiliary seal in contact with the water, said seal generally being in the form of a shaft seal, and an inner main seal, which can be provided, for example, with a plurality of main shaft seal sections. The purpose of the auxiliary seal consists in preventing contact between harmful substances such as sand or the like and the main seal for as long as possible. Such harmful substances could gradually destroy the main seal and such auxiliary seals are intended to achieve the longest possible maintenance intervals. The filling of the hollow space between the seals with pressure oil also serves, in the event of a loss or decrease in the sealing action of the auxiliary seal, to avoid the penetration of water in the direction of the main seal. The oil supply in the hollow space must therefore be monitored and topped up from time to time. The disadvantage of this arrangement is that pressure oil escapes toward the water side through the auxiliary seal, if the auxiliary seal is adversely affected by the use especially of abrasive media, so that environmental pollution cannot be avoided.

On the other hand, an object of the invention is to provide an improved sealing arrangement which operates in a more environmentally safe and operationally reliable manner.

This object is achieved by providing that the chamber intermediate the main and auxiliary seals is continuously connected by a feed opening with an environmentally harmless separating medium under pressure and is provided with an outlet opening for the separating medium, the pressure of the separating medium and the dimensions of the feed opening and outlet opening are so adjusted to one another that a certain amount of separating medium escapes through the auxiliary seal. By using a separating medium which is continuously supplied into the hollow space, which medium is compressed air in an especially advantageous preferred embodiment, and by using the design according to the invention, a continuous sealing pressure is maintained in the hollow space which can serve on the one hand to press the main seal firmly against the parts to be sealed and on the other hand can serve to largely prevent the penetration of abrasive media, for example, sand, through the auxiliary seal. Since an outlet opening is also provided, pollutants which are in the hollow space can be continuously flushed from the latter. The space in front of the main seal is thereby kept free of contamination, and the main seal itself can enjoy a longer service life.

The flushing effect of the hollow space can be improved by locating the outlet opening at the lowest point on the hollow space in the operating position, where sand or the like will collect, for example, and can be flushed away. The supply or inlet opening in this design is advantageously located opposite the outlet opening, at the highest point on the hollow space.

In particularly preferred embodiments, the main seal includes two rings, associated respectively with the shaft and the sealed housing, which are pressed together at facing polished sealing surfaces which rub against one another during rotation of the shaft. In this arrangement the pressurized separating medium supports the sealing action by pressing the rings together. In certain preferred embodiments the rings are each provided with an angular cross-section and comprise a sealing surface on the free side of the edges which face one another. In certain especially preferred embodiments, the rings are forced together by respective elastically deformable sealing members of rubber or perbunan pressed against the same, said deformable sealing members being supported in a tight fitting manner against a flange mounted on the shaft and a collar projecting from the housing. These last mentioned features contribute to increased sealing action of the main seal.

Preferred embodiments are contemplated which include as an auxiliary seal, a sealing ring mounted in a through opening for the shaft and abutting the surface of the shaft. This arrangement lends itself to not impeding the desired escape of a portion of the separating medium through the auxiliary seal.

In certain preferred embodiments, the separating medium is compressed air which is advantageously produced by a pump, said pump being driven by the shaft to be sealed. In particular, when compressed air is used, no environmental pollution can occur although the separating medium continuously escapes to the outside through the space between the auxiliary seal and the outlet opening. The invention has also the advantage that polluted water and impurities such as sand or the like which have penetrated between the seals into the chamber during operating pauses, are immediately flushed out of the chamber at the beginning of a new operating phase through the outlet openings, and have no opportunity to have a harmful effect upon the sealing action of the main seal.

These and further objects, features and advantages of the present invention will become more obvious from the following description when taken in connection with the accompanying drawing which show, for purposes of illustration only, a single embodiment in accordance with the present invention.

BRIEF DESCRIPTION OF THE DRAWING

The single drawing FIGURE is a side, partial, sectional view showing a sealing arrangement constructed in accordance with a preferred embodiment of the present invention.

DETAILED DESCRIPTION OF THE DRAWING

The drawing shows a connecting line 1, connected in a manner not shown in greater detail with a compressed air source, preferably a compressed air pump or a compressed air tank. The compressed air pump can be driven, for example, directly or indirectly by the shaft 7 to be sealed. In the drawing, S schematically depicts the means (compressed air pump) for supplying the separating medium. However, embodiments are also contemplated, especially if the shaft 7 is a drive shaft for the screw of a ship, to utilize any compressed air sources which are available in any case from the operation of the ship, for connection to line 1. Connecting line 1 is provided in a housing 6 and terminates in a space 2, delimited by a main seal 4, housing 6, and shaft 7 to be sealed. Shaft 7 to be sealed is rotatably mounted with respect to housing 6 by means of known bearings, which are not shown.

Chamber 2 is sealed from the exterior by an auxiliary seal 3, consisting of a sealing ring, disposed in a through opening 8 in housing 6 for shaft 7.

Chamber 2 is provided at its lower end with an outlet opening 5, so disposed that it is always located at the lowest point in chamber 2. Feed opening 1 is disposed opposite this lowest point, i.e. at the highest point in chamber 2 in housing 6.

Main seal 4 consists individually of two rings 9 and 10 with an angular profile, whose matching edges on their end surfaces are each provided with a polished sealing surface 11. The two rings 9 and 10 have their sealing surfaces 11 forced together by elastic sealing rings or members 12, for example made of Perbunan or rubber, whereby sealing rings 12 abut respectively, a flange 13 which is permanently mounted on shaft 7 and a collar 14 projecting from housing 6 in the direction of shaft 7 to be sealed.

A separating medium, compressed air in the illustrated embodiment, is continuously supplied through feed opening 1 at a certain pressure into chamber 2. The compressed air can then escape through outlet opening 5 into the environment, for example into the surrounding water when shaft 7 is the tail shaft for a ship's screw. The dimensions of the outlet opening 5 and the feed opening 1 and the level of the selected compressed air pressure are so adjusted to one another that a portion of the compressed air also escapes to the outside through auxiliary seal 3. At the same time, the pressure in chamber 2 increases the forcing action of the two rings 9 and 10 against each other. Shaft 7, which must be mounted to be axially displaceable by a certain amount for this purpose, is constantly pressed rightward by the pressure exerted by flange 13, so that as a result, in addition to the elastic pressure exerted by Perbunan rings 12, the sealing pressure is maintained on sealing surfaces 11.

Since the compressed air is supplied to the chamber at a pressure which is higher than the counterpressure of the medium outside housing 1, for example, polluted water which can contain sand, the abrasive sand particles are kept away from auxiliary seal 3 because there is compressed air constantly present between auxiliary seal 3 and shaft 7. Any polluted water which does enter, which could enter through opening 5 during operating pauses for example, is flushed out again through opening 5 by the separating medium when operation resumes, so that it can have no harmful effect upon the sealing action of rings 9 and 10. The service life of the main seal and the maintenance intervals can thereby be kept very long.

Embodiments are also contemplated which use non-aggressive water or the like as the separating medium instead of compressed air. The design according to the invention produces a seal which has a long lifetime even when used in abrasive media. Environmental pollution is prevented.

While I have shown and described several embodiments in accordance with the present invention, it is understood that the same is not limited thereto but is susceptible to numerous changes and modifications as known to those skilled in the art and I therefore do not wish to be limited to the details shown and described herein but intend to cover all such changes and modifications as are encompassed by the scope of the appended claims.

I claim:

1. Sealing arrangement for a shaft rotatably mounted in a housing, and operable in abrasive media, comprising:
    a main seal and an auxiliary seal fitting around the shaft and extending between respective surfaces associated with said shaft and said housing,
    a chamber formed between the main and auxiliary seals by housing and shaft parts, said chamber being located at the side of the main seal closest to the auxiliary seal,
    a feed opening for continuously communicating a pressurized environmentally harmless separating medium to said chamber,
    an outlet opening in said chamber for the separating medium,
    and pressure medium supply means for supplying said environmentally harmless separating medium to said feed opening under pressure,
    said pressure medium supply means and the dimensions of the feed and outlet openings being correlated to one another to assure that a certain amount of the separating medium continuously escapes from the chamber through the auxiliary seal during operation of the shaft to prevent ingress of the surrounding abrasive media into the chamber,
    and wherein said outlet opening is provided at the point in the chamber which is lowest in the operating position of the sealing arrangement whereby pollutants which are in the chamber can be flushed from the latter.

2. Sealing arrangement according to claim 1, wherein the feed opening is provided opposite the outlet opening, at the highest point in the chamber.

3. Sealing arrangement according to claim 1, wherein the pressure medium supply means comprises a pump driven by the shaft.

4. Sealing arrangement according to claim 1, wherein the pressure medium supply means includes means to supply compressed air as the separating medium.

5. Sealing arrangement according to claim 1 or 4, wherein the main seal includes two rings which are associated respectively with the shaft and the housing, said rings being pressed together with polished sealing surfaces thereof rubbing against one another during operation of the shaft.

6. Sealing arrangement according to claim 5, wherein the rings are provided with an angular cross-section and comprise sealing surfaces on the free side of their respective edges which are directed toward each other.

7. Sealing arrangement according to claim 6, wherein the rings are forced together by elastically deformable sealing members pressed tightly against them, and being supported respectively in a tight-fitting manner against a flange mounted on the shaft and on a collar projecting from the housing toward the shaft.

8. Sealing arrangement according to claim 1, wherein the auxiliary seal is a sealing ring mounted in a housing through opening for the shaft, said auxiliary seal sealing ring abutting the surface of the shaft.

9. Sealing arrangement according to claim 5, wherein the main seal ring supported at the shaft is acted upon by the pressure in the chamber to push the shaft in a direction increasing the pressure on the sealing rubbing surfaces.

10. Sealing arrangement according to claim 7, wherein the auxiliary seal is a sealing ring mounted in a housing through opening for the shaft, said auxiliary sealing ring abutting the surface of the shaft.

11. Sealing arrangement according to claim 10, wherein the main seal ring supported at the shaft is acted upon by the pressure in the chamber to push the shaft in a direction increasing the pressure on the sealing rubbing surfaces.

* * * * *